United States Patent
Suarez et al.

(10) Patent No.: US 9,605,783 B2
(45) Date of Patent: Mar. 28, 2017

(54) ROTARY FLUID COUPLING

(71) Applicant: The Boeing Company, Chicago, IL (US)

(72) Inventors: John F. Suarez, Mission Viejo, CA (US); Ryan C. Polito, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 14/524,059

(22) Filed: Oct. 27, 2014

(65) Prior Publication Data

US 2016/0116091 A1    Apr. 28, 2016

(51) Int. Cl.
*F16L 27/08* (2006.01)
*F16L 25/00* (2006.01)
*B33Y 80/00* (2015.01)

(52) U.S. Cl.
CPC ........... *F16L 27/0808* (2013.01); *B33Y 80/00* (2014.12); *F16L 25/00* (2013.01); *F16L 27/0812* (2013.01)

(58) Field of Classification Search
CPC .... F16L 27/0808; F16L 27/0812; F16L 25/00
See application file for complete search history.

(56) References Cited

U.S. PATENT DOCUMENTS

| | | | |
|---|---|---|---|
| 1,204,822 A * | 11/1916 | Roylance | F16L 27/0812 285/280 |
| 1,509,562 A | 9/1924 | Macgregor | |
| 1,532,395 A * | 4/1925 | Fulton | F16L 27/0812 138/127 |
| 1,711,761 A | 5/1929 | Warren et al. | |
| 3,552,778 A | 1/1971 | Muller | |
| 4,928,997 A * | 5/1990 | Reisener | F16L 39/04 285/121.6 |
| 5,022,686 A * | 6/1991 | Heel | B23Q 11/103 285/121.4 |
| 5,174,614 A * | 12/1992 | Kaleniecki | F16L 27/00 285/279 |
| 5,275,446 A * | 1/1994 | Menzel | F16L 59/185 285/121.6 |

(Continued)

OTHER PUBLICATIONS

Search Report for related European Application No. EP15190976; report dated Mar. 17, 2016.

*Primary Examiner* — Rodney Mintz
(74) *Attorney, Agent, or Firm* — Miller, Matthias & Hull LLP

(57) ABSTRACT

A fluid coupling includes inner and outer members capable of rotating relative to each other. The inner member includes an inner member interior wall centered about a coupling axis, and a first inner member seal wall centered about the coupling axis and spaced radially outwardly from the inner member interior wall to define a first gap between the inner member interior wall and the first inner member seal wall. The outer member has an outer member exterior wall centered about the coupling axis and surrounding the first inner member seal wall, and a first outer member seal wall centered about the coupling axis and spaced radially inwardly from the outer member exterior wall. The first outer member seal wall is disposed in the first gap to form a labyrinthine seal passage between the inner and outer members.

19 Claims, 3 Drawing Sheets

(56) References Cited

U.S. PATENT DOCUMENTS

| | | | |
|---|---|---|---|
| 5,372,389 A | | 12/1994 | Tam et al. |
| 5,405,173 A | | 4/1995 | Goughneour |
| 5,435,607 A | | 7/1995 | Everett |
| 5,458,375 A | * | 10/1995 | Anspach, Jr. ........... F16L 39/04 |
| | | | 285/121.2 |
| 5,651,567 A | | 7/1997 | Kaleniecki et al. |
| 6,135,138 A | * | 10/2000 | Richards, Jr. ....... F16L 27/0808 |
| | | | 137/312 |
| 6,351,045 B1 | * | 2/2002 | Shoykhet ............... H02K 9/193 |
| | | | 310/52 |
| 6,990,751 B2 | | 1/2006 | Riley et al. |
| 7,374,211 B2 | | 5/2008 | Reifschneider et al. |
| 9,133,969 B2 | * | 9/2015 | Forni .................. F16L 27/0828 |
| 2002/0063167 A1 | * | 5/2002 | Stoffers .................... B05B 3/02 |
| | | | 239/252 |
| 2010/0206410 A1 | | 8/2010 | Patten et al. |
| 2014/0023812 A1 | | 1/2014 | Hammer et al. |
| 2014/0091568 A1 | | 4/2014 | Forni et al. |

\* cited by examiner

ROTARY FLUID COUPLING

FIELD

The present disclosure generally relates to fluid couplings and, more specifically, to rotary fluid couplings that permit one connection end to rotate relative to the other connection end.

BACKGROUND

In the hydraulic and pneumatic fields, rotary fluid couplings are generally known for connecting a stationary element to a rotating element while maintaining fluid communication between the two elements. Accordingly, known rotary fluid couplings may include a stationary component that is coupled to the stationary element and a rotatable component that is coupled to the rotating element. A conduit running through the stationary and rotatable components permits fluid to flow through the rotary fluid coupling from the stationary element to the rotating element.

One or more seals are typically provided between the stationary and rotatable components to prevent fluid from leaking from the conduit to an exterior of the rotary fluid coupling. For example, O-rings or similar seal structures are disposed between the stationary and rotating components to prevent leaks. Because these seal structures engage both the stationary and rotatable components of the rotary fluid coupling, they are subject to wear during rotation of the rotatable component, causing seal failure and requiring replacement.

SUMMARY

In accordance with one aspect of the present disclosure, a fluid coupling includes an inner member and an outer member. The inner member has an inner member connection port, an inner member interior wall extending along a coupling axis and defining a conduit in fluid communication with the inner member connection port, the inner member interior wall further defining a coupling aperture in fluid communication with the conduit, and a first inner member seal wall extending along the coupling axis and spaced radially outwardly from the inner member interior wall to define a first gap between the inner member interior wall and the first inner member seal wall. The outer member has an outer member connection port in fluid communication with the coupling aperture, an outer member exterior wall extending along the coupling axis and surrounding the first inner member seal wall, and a first outer member seal wall extending along the coupling axis and spaced radially inwardly from the outer member exterior wall, the first outer member seal wall being disposed in the first gap and sized relative to the first gap to permit rotation between the outer member and the inner member.

In accordance with another aspect of the present disclosure, a fluid coupling includes an inner member and an outer member. The inner member has an inner member connection port, an inner member interior wall having a cylindrical shape and extending along a coupling axis, the inner member interior wall defining a conduit in fluid communication with the inner member connection port, the inner member interior wall further defining a coupling aperture in fluid communication with the conduit, a first inner member seal wall having a cylindrical shape, extending along the coupling axis, and spaced radially outwardly from the inner member interior wall to define a first cylindrical gap between the inner member interior wall and the first inner member seal wall, a second inner member seal wall having a cylindrical shape and extending along the coupling axis, the second inner member seal wall being spaced radially outwardly from the first inner member seal wall to define a second cylindrical gap between the first inner member seal wall and the second inner member seal wall, and an inner member end wall joining the inner member interior wall to the first and second inner member seal walls. The outer member has an outer member connection port in fluid communication with the coupling aperture, an outer member exterior wall having a cylindrical shape surrounding the first inner member seal wall and extending along the coupling axis, a first outer member seal wall having a cylindrical shape and extending along the coupling axis, the first outer member seal wall being spaced radially inwardly from the outer member exterior wall, disposed in the first cylindrical gap, and sized relative to the first cylindrical gap to permit rotation between the outer member and the inner member, a second outer member seal wall having a cylindrical shape and extending along the coupling axis, the second outer member seal wall being disposed between the outer member exterior wall and the first outer member seal wall, the second outer member seal wall further being disposed in the second cylindrical gap and sized relative to the second cylindrical gap to permit rotation between the outer member and the inner member, a first outer member end wall joining the outer member exterior wall to the first and second outer member seal walls, and a second outer member end wall extending radially inwardly from the outer member exterior wall and positioned outwardly of the inner member end wall, the second outer member end wall defining the outer member connection port.

In accordance with a further aspect of the present disclosure, a method is provided for sealing a conduit of a rotary fluid coupling from an exterior of the rotary fluid coupling, the rotary fluid coupling having inner and outer members rotatable relative to each other. The method includes forming the inner member with an inner member interior wall extending along a coupling axis and defining the conduit, and a first inner member seal wall extending along the coupling axis and spaced radially outwardly from the inner member interior wall to define a first gap between the inner member interior wall and the first inner member seal wall. The outer member is formed with an outer member exterior wall extending along the coupling axis and surrounding the first inner member seal wall, and a first outer member seal wall extending along the coupling axis and spaced radially inwardly from the outer member exterior wall, the first outer member seal wall being disposed in the first gap. The first outer member seal wall is sized relative to the first gap to permit relative rotation between the inner and outer members. The first outer member seal wall extends into the first gap to form a labyrinthine seal passage between the inner member and the outer member that extends from the conduit to the exterior of the rotary fluid coupling.

In another aspect of the disclosure that may be combined with any of these aspects, a labyrinthine seal passage is formed between the inner member and the outer member that extends from the conduit to an exterior of the fluid coupling.

In another aspect of the disclosure that may be combined with any of these aspects, the labyrinthine seal passage includes a first passage segment formed between the outer member exterior wall and the second inner member seal wall, a second passage segment formed between the second inner member seal wall and the second outer member seal wall, a third passage segment formed between the second outer member seal wall and the first inner member seal wall, a fourth passage segment formed between the first inner member seal wall and the first outer member seal wall, and a fifth passage segment formed between the first outer member seal wall and the inner member interior wall.

In another aspect of the disclosure that may be combined with any of these aspects, the conduit has a conduit diameter, and in which each of the first, second, third, fourth, and fifth passage segments has a length greater than the conduit diameter.

In another aspect of the disclosure that may be combined with any of these aspects, the inner member further includes an inner member end wall joining the inner member interior wall to the first and second inner member seal walls, and the outer member further includes a first outer member end wall joining the outer member exterior wall to the first and second outer member seal walls, and a second outer member end wall extending radially inwardly from the outer member exterior wall and positioned outwardly of the inner member end wall, the second outer member end wall defining the outer member connection port.

In another aspect of the disclosure that may be combined with any of these aspects, the inner member further includes an inner member flange extending radially outwardly from the inner member sidewall and adjacent the first outer member end wall.

In another aspect of the disclosure that may be combined with any of these aspects, the labyrinthine seal passage further includes a sixth passage segment formed between the inner member end wall and the second outer member end wall, and a seventh passage segment formed between the inner member flange and the first outer member end wall.

In another aspect of the disclosure that may be combined with any of these aspects, the outer member is secured in a stationary position and the inner member rotates relative to the outer member.

It should be understood that the drawings are not necessarily drawn to scale and that the disclosed embodiments are sometimes illustrated schematically. It is to be further appreciated that the following detailed description is merely exemplary in nature and is not intended to limit the present disclosure or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
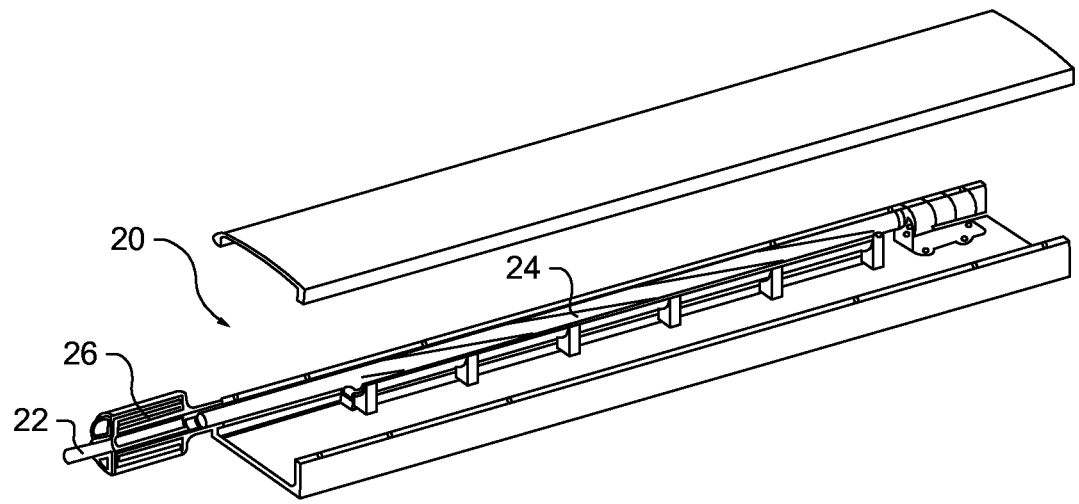
FIG. 1 is an exploded, perspective view of an assembly showing a stationary element coupled to a rotating element by a rotary fluid coupling, with the rotary fluid coupling shown in cross-section, according to an embodiment of the present disclosure.

FIG. 1 illustrates an assembly 20 showing a stationary element 22 coupled to a rotating element 24 by a rotary fluid coupling 26. The rotary fluid coupling 26 allows the rotating element 24 to rotate while communicating a pressurized fluid therethrough while permitting an amount of leakage that would not affect operation of the attached devices.

In an exemplary application, the assembly 20 may form part of a high lift system provided on a wing of an aircraft (not shown), with the stationary element 22 being a pressurized air supply and the rotating element 24 being a rotating conduit. However the rotary fluid coupling 26 may be used in other types of applications.

Figure 2:
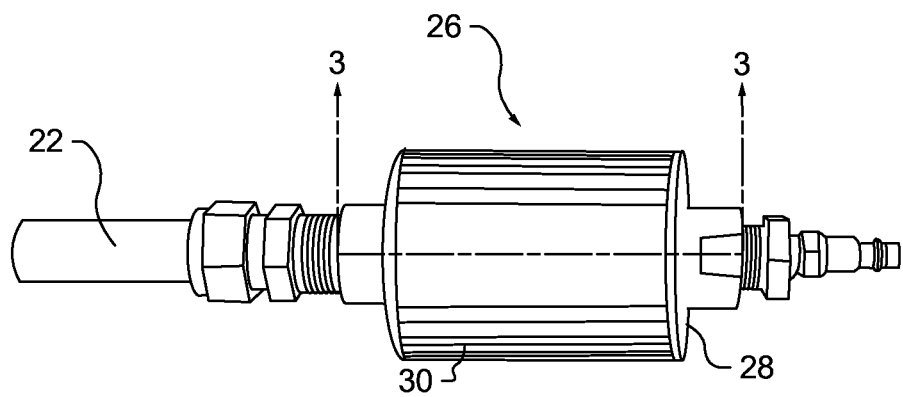
FIG. 2 is a side elevation view of the rotary fluid coupling of FIG. 1.

Referring to FIG. 2, the rotary fluid coupling 26 may include an inner member 28 and an outer member 30. The inner and outer members 28, 30 are rotatable relative to each other. In the illustrated embodiment, the outer member 30 is coupled to the stationary element 22, and therefore the outer member 30 is secured in a stationary position. The inner member 28 is coupled to the rotating element 24, and therefore the inner member 28 rotates relative to the outer member 30. It will be appreciated that an alternative configuration of the rotary fluid coupling 26 may be used, in which the outer member 30 rotates relative to an inner member 28 that is stationary. Furthermore, in some embodiments, the rotary fluid coupling 26 is formed entirely of two parts, namely the inner and outer members.

Figure 3:
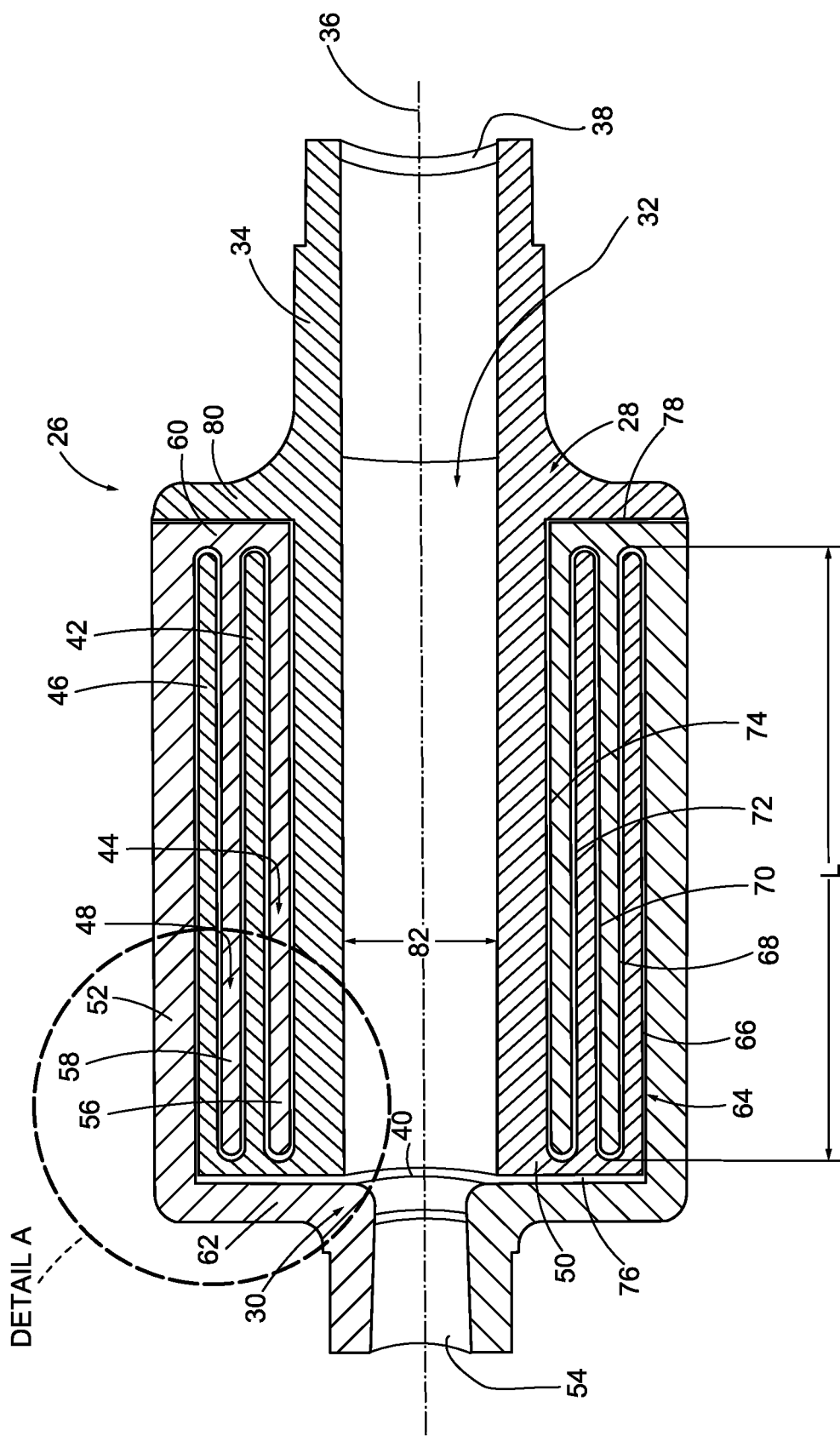
FIG. 3 is a side elevation view, in cross-section, of the rotary fluid coupling taken along line 3-3 of FIG. 2.

As best shown in FIG. 3, the inner member 28 defines conduit 32 for fluid traveling through the rotary fluid coupling 26. More specifically, the inner member 28 includes an inner member interior wall 34 defining the conduit 32. The inner member interior wall 34 may have a cylindrical shape centered about a coupling axis 36. The inner member interior wall 34 may further define an inner member connection port 38 in fluid communication with the conduit 32 and adapted for connection to an exterior component, such as the rotating element 24 (shown in FIG. 1). The inner member interior wall 34 may further define a coupling aperture 40 that also fluidly communicates with the conduit 32. The coupling aperture 40 may be located at a first or upstream end of the inner member interior wall 34, while the inner member connection port 38 may be located at a second or downstream end of the inner member interior wall 34.

Figure 4:
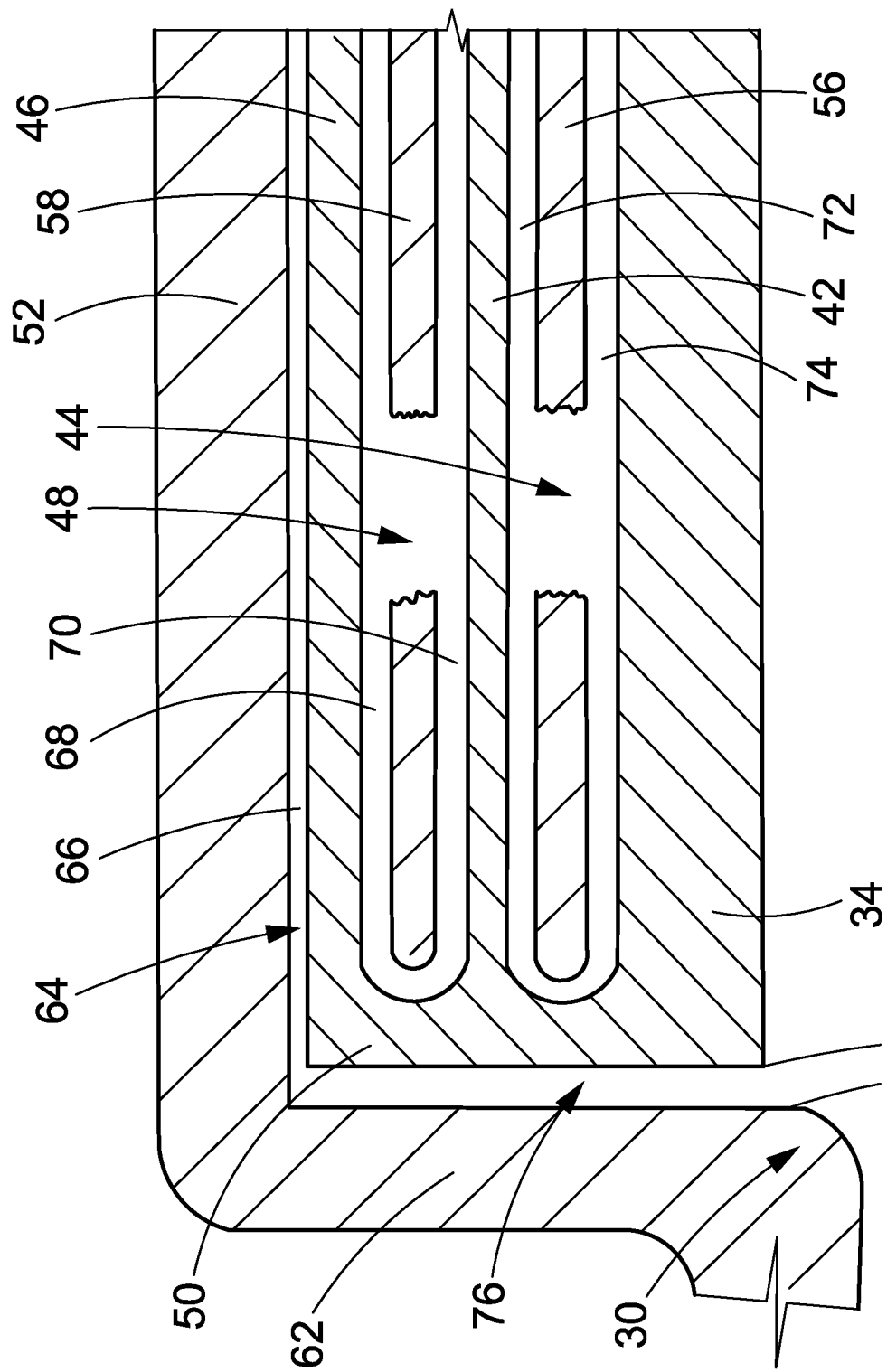
FIG. 4 is an enlarged detail of the cross-sectional view of FIG. 3, with portions of an outer member removed for clarity.

The inner member 28 may include seal walls (described in greater detail below) which, in combination with similar structure of the outer member 30, create a seal passage that limits the amount of fluid leaking from the conduit 32 to an exterior of the rotary fluid coupling 26. For example, the inner member 28 may include a first inner member seal wall 42. The first inner member seal wall 42 may have a cylindrical shape centered about the coupling axis 36. The first inner member seal wall 42 may be spaced radially outwardly from the inner member interior wall 34 to define a first gap 44 (FIG. 4) between an outer surface of the inner member interior wall 34 and an inner surface of the first inner member seal wall 42. In the illustrated embodiment, the first gap 44 has a cylindrical shape, however the first gap 44 may have a conical, frustoconical, parabolic, or other shape corresponding to a surface of revolution formed about an the coupling axis 36.

Additionally, the inner member 28 optionally may include a second inner member seal wall 46 spaced radially outwardly from the first inner member seal wall 42 to define a second gap 48 between an outer surface of the first inner member seal wall 42 and an inner surface of the second inner member seal wall 46. In the illustrated embodiment, the second gap 48 has a cylindrical shape, however the second gap 48 may have a conical, frustoconical, parabolic, or other shape corresponding to a surface of revolution formed about an the coupling axis 36. The second inner member seal wall 46 may have a cylindrical shape and may be centered about the coupling axis 36. An inner member end wall 50 may extend radially relative to the coupling axis 36 to join the inner member interior wall 34 to the first inner member seal wall 52 and the second inner member seal walls 46.

Continuing with reference to FIG. 3, the outer member 30 may include an outer member exterior wall 52 surrounding at least a portion of the inner member 28. In the exemplary embodiment, the outer member exterior wall 52 surrounds the first inner member seal wall 42 and the second inner member seal wall 46. The outer member exterior wall 52 may have a cylindrical shape and may be centered about the coupling axis 36. The outer member 30 may further include an outer member connection port 54 in fluid communication with the coupling aperture 40 and adapted for connection to an exterior component, such as the stationary element 22 as shown in FIG. 1.

Similar to the inner member 28, the outer member 30 may include one or more seal walls, which will now be described in greater detail. For example, the outer member 30 may include a first outer member seal wall 56 spaced radially inwardly from the outer member exterior wall 52. The first outer member seal wall 56 may have a cylindrical shape and may be centered about the coupling axis 36. The first outer member seal wall 56 further may be disposed in the first gap 44 and may be sized relative to the first gap 44 to permit rotation between the outer member 30 and the inner member 28.

Additionally, the outer member 30 optionally may include a second outer member seal wall 58 disposed between the outer member exterior wall 52 and the first outer member seal wall 56. The second outer member seal wall 58 may have a cylindrical shape and may be centered about the coupling axis 36. The second outer member seal wall 58 further may be disposed in the second gap 48 and may be sized relative to the second gap 48 to permit rotation between the outer member 30 and the inner member 28. A first outer member end wall 60 may extend radially relative to the coupling axis 36 to join the outer member exterior wall 52 to the first and second outer member seal walls 56, 58. The outer member 30 may further include a second outer member end wall 62 extending radially inwardly from the outer member exterior wall 52 and located outwardly of the inner member end wall 50. In the illustrated embodiment, the second outer member end wall 62 also defines the outer member connection port 54.

The inner and outer members 28, 30 may be formed of a material that promotes relative rotation between the inner and outer members 28, 30. For example, the material may have a self-lubricating or low friction surface, such as polycarbonate or polytetrafluoroethylene. These materials are identified merely as examples, as other materials may be used.

The examples of the inner and outer members 28, 30 described above include seal walls that define a seal passage 64 between the inner and outer members 28, 30 having a labyrinthine shape extending from the conduit 32 to the exterior of the rotary fluid coupling 26, thereby to reduce fluid leakage therethrough. In the embodiment illustrated in FIG. 3, the labyrinthine seal passage 64 includes: a first passage segment 66 formed between the outer member exterior wall 52 and the second inner member seal wall 46; a second passage segment 68 formed between the second inner member seal wall 46 and the second outer member seal wall 58; a third passage segment 70 formed between the second outer member seal wall 58 and the first inner member seal wall 42; a fourth passage segment 72 formed between the first inner member seal wall 42 and the first outer member seal wall 56; and a fifth passage segment 74 formed between the first outer member seal wall 56 and the inner member interior wall 34. In the illustrated embodiment, each of the first passage segment 66, second passage segment 68, third passage segment 70, fourth passage segment 72, and fifth passage segment 74 has a cylindrical shape. Alternatively, the passage segments may have conical, frustoconical, parabolic, or other shapes corresponding to a surface of revolution formed about an the coupling axis 36.

Additionally, the labyrinthine seal passage 64 may further include a sixth passage segment 76 formed between the inner member end wall 50 and the second outer member end wall 62, and a seventh passage segment 78 formed between an inner member flange 80 and the first outer member end wall 60. The sixth passage segment 76 and the seventh passage segment 78 may have annular shapes and may be centered about the coupling axis 36.

Providing the back-and-forth traversing, labyrinthine configuration extends the length of the seal passage 64 to reduce fluid leakage therethrough. For example, the length of the labyrinthine seal passage 64 may be substantially larger than a diameter 82 of the conduit 32. In some applications, each of the first passage segment 66, second passage segment 68, third passage segment 70, fourth passage segment 72, and fifth passage segment 74 may have a length "L" that is greater than the diameter 82 of the conduit 32. Without wishing to be bound by any theory, it is believed that the extended length of the labyrinthine seal passage 64 increases the amount of surface area of the passage, thereby increasing the amount of surface friction acting on a fluid traveling along the passage and in turn reducing the amount of fluid that will leak to the exterior of the rotary fluid coupling 26. For example, the seal passage 64 may permit a minimal or insignificant amount of pressure to be lost therethrough. Furthermore, because no additional seal components are used that engage both the inner and outer members 28, 30, the excessive wear issues associated with prior components are avoided.

While the illustrated embodiment shows each of the passage segments having similar sizes, including similar lengths and widths, it will be appreciated that one or more of the passage segments may have a different size. For example, while FIG. 3 shows the passage segments having substantially equal lengths and widths, one or more of the passage segments may have a different length and/or width. Still further, each passage segment may have a unique length and/or width, depending on the configuration of the inner and outer members 28, 30.

Still further, while the illustrated embodiment shows a seal passage configuration having a specific number of passage segments, the rotary fluid coupling 26 may have more or less than the number of passage segments shown. The type of fluid, as well as the operating pressure of that fluid, may be considered when determining a suitable length of the seal passage 64, which in turn determines the desirable number of seal passage segments.

In view of the foregoing, a method is provided of sealing a conduit 32 of a rotary fluid coupling 26 from an exterior of the rotary fluid coupling 26, wherein the rotary fluid coupling 26 has inner and outer members 28, 30 rotatable relative to each other. The method includes forming the inner member 28 with an inner member interior wall 34 centered about a coupling axis 36 and defining the conduit 32, and a first inner member seal wall 42 centered about the coupling axis 36 and spaced radially outwardly from the inner member interior wall 34 to define a first gap 44 between the inner member interior wall 34 and the first inner member seal wall 42. Additionally, the outer member 30 is formed with an outer member exterior wall 52 centered about the coupling axis 36 and surrounding the first inner member seal wall 42, and is further formed with a first outer member seal wall 56 centered about the coupling axis 36 and spaced radially inwardly from the outer member exterior wall 52, with the first outer member seal wall 56 being disposed in the first gap 44.

The method further includes sizing the first outer member seal wall 56 relative to the first gap 44 to permit relative rotation between the inner and outer members 28, 30. Additionally, the first outer member seal wall 56 is extended into the first gap 44 to form a labyrinthine seal passage 64 between the inner member 28 and the outer member 30. The seal passage 64 extends between the conduit 32 and the environment surrounding the rotary fluid coupling 26. As noted above, the seal passage 64 may be configured to permit an acceptable amount of leakage, such as an amount of leakage that would not adversely affect operation of the components coupled to the rotary fluid coupling 26.

In some applications, the method may include further forming the inner member 28 with a second inner member seal wall 46 centered about the coupling axis 36 and spaced radially outwardly from the first inner member seal wall 42 to define a second gap 48 between the first inner member seal wall 42 and the second inner member seal wall 46. Additionally, the method may include further forming the outer member 30 with a second outer member seal wall 58 centered about the coupling axis 36 and disposed between the outer member exterior wall 52 and the first outer member seal wall 56, with the second outer member seal wall 58 being disposed in the second gap 48. The second outer member seal wall 58 may be sized relative to the second gap 48 to permit relative rotation between the inner and outer members 28, 30, and the second outer member seal wall 58 may be extended into the second gap 48 to form a portion of the labyrinthine seal passage 64.

In some embodiments, the inner and outer members 28, 30 may be simultaneously formed using an additive manufacturing process. For example, a three-dimensional printing technique, such as fused deposition modeling, may be used to simultaneously form the inner and outer members 28, 30. When fabricating using an additive manufacturing process, the inner and outer members 28, 30 may be formed simultaneously and in an assembled configuration, and therefore further assembly may not be needed to provide a complete rotary fluid coupling 26. Such a process facilitates the formation of the seal wall configuration shown in FIG. 3 that would otherwise be extremely difficult to construct using traditional fabrication methods. Furthermore, when using an additive manufacturing process, the rotary fluid coupling 26 may comprise only two components, namely the inner member 28 and the outer member 30.

Despite any difficulties with conventional manufacturing processes, however, the inner and outer members 28, 30 may be constructed using conventional methods, such as by machining sub-components that are later assembled together. The use of conventional manufacturing processes may require intermediate sub-assembly steps, such as positioning a sub-component of the inner member 28 relative to a sub-component of the outer member 30, to obtain the final assembly of the rotary fluid coupling 26. After an intermediate sub-assembly step, additional sub-components of the inner and outer members 28, 30 may be added to the existing sub-assembly, such as by welding or other methods of joining separate elements.

It will be appreciated that the foregoing description provides examples of the disclosed apparatus and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fluid coupling, comprising:
an inner member including:
an inner member connection port;
an inner member end wall;
an inner member interior wall extending from the inner member connection port to the inner member end wall, the inner member interior wall centered about a coupling axis and defining a conduit in fluid communication with the inner member connection port, the inner member interior wall further defining a coupling aperture in fluid communication with the conduit;
a first inner member seal wall extending from the inner member end wall toward the inner member connection port, the first inner member seal wall centered about the coupling axis and spaced radially outwardly from the inner member interior wall to define a first gap between the inner member interior wall and the first inner member seal wall; and
an inner member flange extending radially outwardly from the inner member interior wall adjacent the inner member connection port; and
an outer member including:
an outer member connection port in fluid communication with the coupling aperture;
a first outer member end wall positioned adjacent the inner member flange;
a second outer member end wall positioned adjacent the inner member end wall;
an outer member exterior wall extending from the first outer member end wall to the second outer member end wall, centered about the coupling axis, and surrounding the first inner member seal wall; and a first outer member seal wall extending from the first outer member end wall toward the outer member connection port, the first outer member seal wall centered about the coupling axis and spaced radially inwardly from the outer member exterior wall, the first outer member seal wall being disposed in the first gap and sized relative to the first gap to permit rotation between the outer member and the inner member;

wherein a labyrinthine seal passage formed between the inner member and the outer member and extending from the conduit to an exterior of the fluid coupling includes a first radial passage segment formed between the inner member end wall and the second outer member end wall, and a second radial passage segment formed between the inner member flange and the first outer member end wall.

2. The fluid coupling of claim 1, in which the outer member is secured in a stationary position and the inner member rotates relative to the outer member.

3. The fluid coupling of claim 1, further comprising:

a second inner member seal wall extending from the inner member end wall and toward the inner member connection port, the second inner member seal wall having a cylindrical shape centered about the coupling axis and being spaced radially outwardly from the first inner member seal wall to define a second cylindrical gap between the first inner member seal wall and the second inner member seal wall; and a second outer member seal wall extending from the first outer member end wall and toward the outer member connection port, the first outer member seal wall having a cylindrical shape and centered about the coupling axis, the second outer member seal wall being disposed between the outer member exterior wall and the first outer member seal wall, the second outer member seal wall further being disposed in the second cylindrical gap and sized relative to the second cylindrical gap to permit rotation between the outer member and the inner member.

4. The fluid coupling of claim 3, in which the labyrinthine seal passage includes:

a first axial passage segment formed between the outer member exterior wall and the second inner member seal wall;

a second axial passage segment formed between the second inner member seal wall and the second outer member seal wall;

a third axial passage segment formed between the second outer member seal wall and the first inner member seal wall;

a fourth axial passage segment formed between the first inner member seal wall and the first outer member seal wall; and a fifth axial passage segment formed between the first outer member seal wall and the inner member interior wall.

5. The fluid coupling of claim 4, in which the conduit has a conduit diameter, and in which each of the first, second, third, fourth, and fifth axial passage segments has a length greater than the conduit diameter.

6. A fluid coupling, comprising:

an inner member including:

an inner member connection port located at a first end of the inner member;

an inner member end wall located at a second end of the inner member opposite the first end of the inner member;

an inner member interior wall extending between the inner member connection port and the inner member end wall, the inner member interior wall centered about a coupling axis and defining a conduit in fluid communication with the inner member connection port, the inner member interior wall further defining a coupling aperture in fluid communication with the conduit; and a first inner member seal wall extending from the inner member end wall and toward the first end of the inner member, the first inner member seal wall centered about the coupling axis and spaced radially outwardly from the inner member interior wall to define a first gap between the inner member interior wall and the first inner member seal wall; and an outer member including:

an outer member connection port located at a first end of the outer member, the first end of the outer member positioned adjacent the second end of the inner member, the outer member connection port in fluid communication with the coupling aperture;

a first outer member end wall located at a second end of the outer member opposite the first end of the outer member, the second end of the outer member positioned adjacent the first end of the inner member;

a second outer member end wall located at a first end of the outer member and adjacent the inner member end wall;

an outer member exterior wall extending between the first outer member end wall and the second outer member end wall, the outer member exterior wall centered about the coupling axis and surrounding the first inner member seal wall; and a first outer member seal wall extending from the first outer member end wall and toward the first end of the outer member, the first outer member seal wall centered about the coupling axis and spaced radially inwardly from the outer member exterior wall, the first outer member seal wall being disposed in the first gap and sized relative to the first gap to permit rotation between the outer member and the inner member.

7. The fluid coupling of claim 1, in which the outer member is secured in a stationary position and the inner member rotates relative to the outer member.

8. The fluid coupling of claim 6, in which the inner member further includes an inner member flange extending radially outwardly from the inner member interior wall and positioned adjacent the first outer member end wall.

9. The fluid coupling of claim 8, in which the labyrinthine seal passage further includes:

a sixth passage segment formed between the inner member end wall and the second outer member end wall; and a seventh passage segment formed between the inner member flange and the first outer member end wall.

10. The fluid coupling of claim 6, in which:

the inner member further comprises a second inner member seal wall extending from the inner member end wall and toward the first end of the inner member, centered about the coupling axis, and spaced radially outwardly from the first inner member seal wall to define a second gap between the first inner member seal wall and the second inner member seal wall; and the outer member further comprises a second outer member seal wall extending from the first outer member end wall and toward the first end of the inner member, centered about the coupling axis, and disposed between the outer member exterior wall and the first outer member seal wall, the second outer member seal wall being disposed in the second gap and sized relative to the second gap to permit rotation between the outer member and the inner member.

11. The fluid coupling of claim 10, in which a labyrinthine seal passage is formed between the inner member and the outer member.

12. The fluid coupling of claim 11, in which the labyrinthine seal passage includes:
   a first passage segment formed between the outer member exterior wall and the second inner member seal wall;
   a second passage segment formed between the second inner member seal wall and the second outer member seal wall;
   a third passage segment formed between the second outer member seal wall and the first inner member seal wall;
   a fourth passage segment formed between the first inner member seal wall and the first outer member seal wall; and
   a fifth passage segment formed between the first outer member seal wall and the inner member interior wall.

13. The fluid coupling of claim 12, in which the conduit has a conduit diameter, and in which a length of each of the first, second, third, fourth, and fifth passage segments is greater than the conduit diameter.

14. The fluid coupling of claim 13, in which the length of each of the first, second, third, fourth, and fifth passage segments is substantially equal.

15. A fluid coupling comprising:
   an inner member including:
      an inner member connection port located at a first end of the inner member;
      an inner member end wall located at a second end of the inner member opposite the first end of the inner member;
      an inner member interior wall extending between the inner member connection port and the inner member end wall, the inner member interior wall having a cylindrical shape centered about a coupling axis and defining a conduit in fluid communication with the inner member connection port, the inner member interior wall further defining a coupling aperture in fluid communication with the conduit;
      a first inner member seal wall extending from the inner member end wall and toward the first end of the inner member, the first inner member seal wall having a cylindrical shape centered about the coupling axis and spaced radially outwardly from the inner member interior wall to define a first cylindrical gap between the inner member interior wall and the first inner member seal wall; and
      a second inner member seal wall extending from the inner member end wall and toward the first end of the inner member, the second inner member seal wall having a cylindrical shape centered about the coupling axis and being spaced radially outwardly from the first inner member seal wall to define a second cylindrical gap between the first inner member seal wall and the second inner member seal wall; and
   an outer member including:
      an outer member connection port located at a first end of the outer member, the first end of the outer member positioned adjacent the second end of the inner member, the outer member connection port in fluid communication with the coupling aperture;
      a first outer member end wall located at a second end of the outer member opposite the first end of the outer member, the second end of the outer member positioned adjacent the first end of the inner member;
      a second outer member end wall located at a first end of the outer member and adjacent the inner member end wall;
      an outer member exterior wall extending between the first outer member end wall and the second outer member end wall, the outer member exterior wall having a cylindrical shape surrounding the first inner member seal wall and centered about the coupling axis;
      a first outer member seal wall extending from the first outer member end wall and toward the first end of the outer member, the first outer member seal wall having a cylindrical shape and centered about the coupling axis, the first outer member seal wall being spaced radially inwardly from the outer member exterior wall, disposed in the first cylindrical gap, and sized relative to the first cylindrical gap to permit rotation between the outer member and the inner member; and
      a second outer member seal wall extending from the first outer member end wall and toward the first end of the outer member, the first outer member seal wall having a cylindrical shape and centered about the coupling axis, the second outer member seal wall being disposed between the outer member exterior wall and the first outer member seal wall, the second outer member seal wall further being disposed in the second cylindrical gap and sized relative to the second cylindrical gap to permit rotation between the outer member and the inner member.

16. The fluid coupling of claim 15, in which the outer member is secured in a stationary position and the inner member rotates relative to the outer member.

17. The fluid coupling of claim 15, in which a labyrinthine seal passage is formed between the inner member and the outer member that extends from the conduit to an exterior of the fluid coupling.

18. The fluid coupling of claim 17, in which the labyrinthine seal passage includes:
   a first passage segment formed between the outer member exterior wall and the second inner member seal wall;
   a second passage segment formed between the second inner member seal wall and the second outer member seal wall;
   a third passage segment formed between the second outer member seal wall and the first inner member seal wall;
   a fourth passage segment formed between the first inner member seal wall and the first outer member seal wall; and
   a fifth passage segment formed between the first outer member seal wall and the inner member interior wall.

19. The fluid coupling of claim 1, in which the conduit has a conduit diameter, and in which each of the first, second, third, fourth, and fifth passage segments has a length greater than the conduit diameter.

* * * * *